(12) United States Patent
Sundstrom

(10) Patent No.: US 9,900,409 B2
(45) Date of Patent: Feb. 20, 2018

(54) CLASSIFICATION ENGINE FOR DATA PACKET CLASSIFICATION

(71) Applicant: Oricane AB, Lulea (SE)

(72) Inventor: Mikael Sundstrom, Lulea (SE)

(73) Assignee: Fabulous Inventions AB, Luleå (SE)

( * ) Notice: Subject to any disclaimer, the term of this patent is extended or adjusted under 35 U.S.C. 154(b) by 501 days.

(21) Appl. No.: 14/374,084

(22) PCT Filed: Feb. 7, 2013

(86) PCT No.: PCT/SE2013/050099
§ 371 (c)(1),
(2) Date: Jul. 23, 2014

(87) PCT Pub. No.: WO2013/119173
PCT Pub. Date: Aug. 15, 2013

(65) Prior Publication Data
US 2015/0032732 A1    Jan. 29, 2015

(30) Foreign Application Priority Data

Feb. 7, 2012   (SE) ...................................... 1250087

(51) Int. Cl.
*G06F 17/30*   (2006.01)
*H04L 29/06*   (2006.01)
(Continued)

(52) U.S. Cl.
CPC ........ *H04L 69/22* (2013.01); *G06F 17/30424* (2013.01); *G06F 17/30598* (2013.01);
(Continued)

(58) Field of Classification Search
CPC ............. G06F 12/0813; G06F 13/4286; G06F 9/3867; G06F 2212/154; G06F 17/3087; G06F 17/30598; G06F 9/30054
See application file for complete search history.

(56) References Cited

U.S. PATENT DOCUMENTS 6,341,130 B1 * 1/2002 Lakshman .............. H04L 45/00
370/351
7,227,842 B1 * 6/2007 Ji ........................... H04L 45/00
370/235
(Continued)

FOREIGN PATENT DOCUMENTS

WO    2011/108168 A1    9/2011

OTHER PUBLICATIONS

Extended European Search Report for corresponding Patent Application No. 13747184.3 dated Sep. 4, 2015.
(Continued)

*Primary Examiner* — Angelica Ruiz
(74) *Attorney, Agent, or Firm* — Renner, Otto, Boisselle & Sklar, LLP

(57) ABSTRACT

The disclosure relates to a static packet classification engine for data packet classification in a data communications network. There is disclosed a static packet classification engine configured to handle rules comprising wildcards and interval matching which is cell tree forest based configured to search clusters to produce results and comprise a priority encoder configured to process the results in terms of matches.

12 Claims, 1 Drawing Sheet

(51) Int. Cl.
  *H04L 12/741*  (2013.01)
  *H04L 12/851*  (2013.01)
  *H04L 12/861*  (2013.01)

(52) U.S. Cl.
  CPC .......... *H04L 45/54* (2013.01); *H04L 47/2483* (2013.01); *H04L 69/12* (2013.01); *H04L 49/90* (2013.01)

(56) References Cited

U.S. PATENT DOCUMENTS

| | | | | |
|---|---|---|---|---|
| 7,643,468 | B1* | 1/2010 | Arregoces | H04L 12/462 370/351 |
| 8,285,719 | B1* | 10/2012 | Long | G06F 17/30598 707/737 |
| 2004/0100956 | A1 | 5/2004 | Watanabe | |
| 2008/0047008 | A1* | 2/2008 | Cho | H04L 12/2854 726/22 |
| 2009/0019162 | A1* | 1/2009 | Riddle | H04L 12/5695 709/226 |
| 2010/0238922 | A1 | 9/2010 | Sundstrom | |
| 2011/0044341 | A1* | 2/2011 | Sundstrom | H04L 69/22 370/392 |

OTHER PUBLICATIONS

Mikael Sundström; "Time and Space Efficient Algorithms for Packet Classification and Forwarding"; Apr. 27, 2007, XP55210018, Retrieved from Internet: URL:http://epubl.ltu.se/1402-1544/2007/15/LTU-DT-0715-SE.pdf.

* cited by examiner

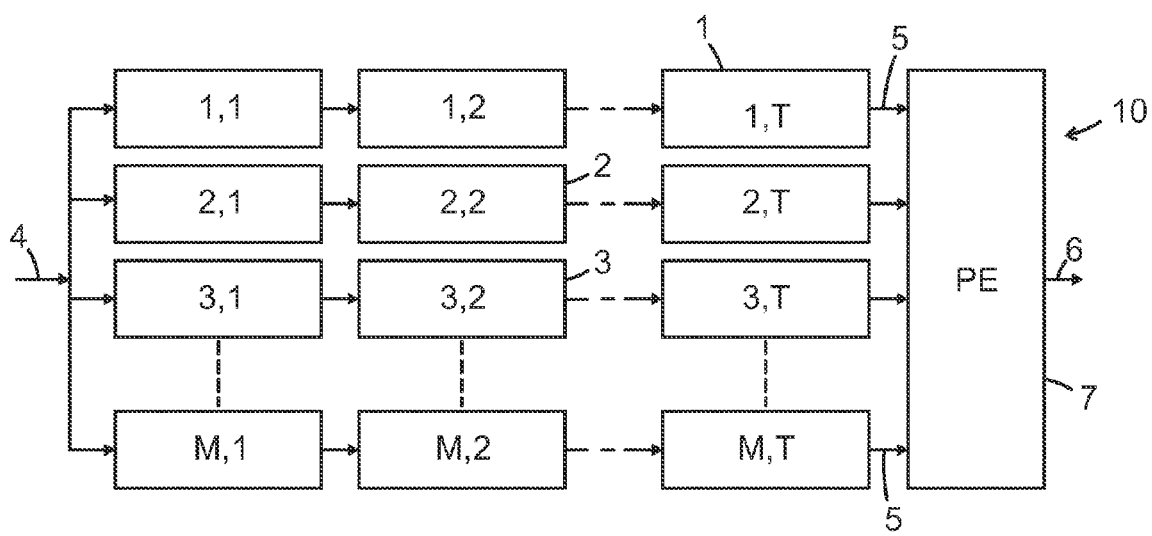

CLASSIFICATION ENGINE FOR DATA PACKET CLASSIFICATION

This application is a national phase of International Application No. PCT/SE2013/050099 filed Feb. 7, 2013 and published in the English language.

TECHNICAL FIELD

The present invention relates to a static packet classification engine for data packet classification in a data communications network.

BACKGROUND

Internet Traffic consists of ordered sequences of packets, or datagrams, where each packet contains header and data. The data contained in each packet usually holds only a fraction from a larger set of data which has been chopped up into pieces and portioned into packets at the source to be gathered and assembled into the original data when reaching the destination.

In the packet header, addressing and protocol information are stored in a number of header fields. For some of these header fields the value changes with each packet while other fields are constant throughout the existence of a communication session. Packets with identical values of the constant fields are typically considered to belong to the same traffic flow.

For security reasons it is sometimes desirable to block certain traffic. This is accomplished by using a firewall. A Firewall is a security device with the main purpose of inspecting traffic and decide whether it is allowed through the firewall or not according to a security policy. The security policy is often entered manually by a system administrator and defines a mapping from potential traffic flows to actions that describes how to process the traffic. To qualify as a firewall, at least two different kinds of actions must be supported: drop and forward. Many commercial firewalls also serve as routers and many commercial routers have at least some firewall functionality. In the following discussion we will use the term router to mean both routers, firewalls as well as combinations of the two.

Packet classification is sometimes referred to as multiple field classification (MFC). The problem is similar to forwarding decisions as header fields match intervals (an address prefix can be represented by an interval) in the most general sense. Multiple fields are matched simultaneously making MFC a D-dimensional classification problem as opposed to forwarding decisions which is a 1-dimensional classification problem.

DESCRIPTION OF THE INVENTION

Before describing the invention, some terms and concepts will be described and defined.
Fragment Classification The purpose of a fragment classifier is to identify fragments from a fragmented packet that belongs to the same original packet to enable further packet classification. This is necessary since only the first fragment contains all header fields needed for complete packet classification. Fragments that belong to the same packet are identified by identical source addresses, destination addresses, identifiers and protocol fields. These four header fields can be combined into an 88-bit datagram key and, in principle, the fragment classifier is a dynamic dictionary data structure containing such datagram keys. The result from lookup is a flow key that are used for dynamic packet classification.

Fragment classification is only required for fragmented packets and the size nmax of the data structure used for fragment classification is determined by the number of concurrent fragmented traffic flows that needs to be handled in the router. Consequently, nmax is typically rather small, say up to a few thousands entries for fragment classification. Since the number of entries in the data structure is rather small, worst case storage is not critical for the fragment classifier. The most characteristic feature of a fragment classifier is that the frequency of updates is almost the same as the number of lookups. This suggests that one should use an extremely dynamic data structure, where umax=tmax to achieve the best overall performance.
Dynamic Packet Classification Communication sessions or traffic flows that are established are usually stored in a dynamic dictionary data structure where each flow is represented by a flow key. The definition of a flow and consequently also the choice of which header fields constituting the flow key depends on the protocol and possible other factors. For IPv4, the most common flow key (for UDP and TCP) contains source and destination ports in addition to source and destination addresses, and protocol giving a total key size of 104 bits. For each traffic flow, there is an entry in the dynamic packet classifier. A high-end router typically support millions of simultaneous traffic flows and it is therefore important to use a data structure with small storage overhead. The ratio between lookups and updates is determined by the average or worst case number of datagrams per traffic flow depending on the choice of optimization criteria. Each traffic flow requires an insert and a delete and each datagram requires a lookup. For a traffic flow with many datagrams, such as an FTP (File Transfer Protocol) download of a large file, the ratio between lookups and updates will be extremely high while other applications, such as http sessions, may result in a rather low ratio. However, choosing a data structure where the cost for updates is 10 times the cost for lookups is not likely to be a bottleneck that limits the overall performance. Note also that a lookup in a static packet classifier is required for each new traffic flow and therefore it does not make sense to design a dynamic packet classifier with substantially faster updates than static packet classifier lookups.
Static Packet Classification From an algorithmic point of view, fragment classification and dynamic packet classification only require a simple search operation, i.e. exact match, while static packet classification requires a dictionary supporting extended search or interval matching. The difference between a simple search and extended search is that a simple search fails if the query key is not present in the dictionary while extended search returns the largest key smaller than the query key present if the query key is not present in the dictionary. Extended search is slightly more complex than simple search in one dimension but in D dimensions (D=5 is typically the case for static packet classification) the difference is dramatic. While both fragment classification and dynamic packet classification can be implemented as 1-dimensional lookups (except that the key is larger than one header field) the multi-dimensional extended search, which is required for static packet classification, is extremely challenging from an algorithmic perspective. Entries in the static packet classifier basically consist of a list of n rules where each rule consists of D of intervals where each interval corresponds to one of D header fields in the datagram. In order to match a rule, each header field must lie within the corresponding interval in the rule. If several rules matches a datagram, the first matching rule in the rule list is typically used. Rule lists are usually entered manually by a system administrator to implement a certain security policy. For the purpose of implementing static packet classification in a router it is therefore assumed that the static packet classifier is completely re-constructed when the security policy changes.

Definitions

In this section, terms that will be used throughout the rest of the disclosure is defined.

As mentioned above, any prefix can be represented as an interval but the opposite is not true. However, a prefix can also be represented as a Ternary Bitmask, i.e. a bit mask where each bit can have the value 0, 1 or don't care (usually denoted by an asterisk *). Any prefix ternary bitmask where the don't care bits are constituted by the least significant bits, i.e. no don't care bit is more significant than a specified bit, represents a prefix and therefore also an interval. However, there are also all other possible ternary bit masks that does not represent prefixes. For a more generic classification engine we would like to also consider these more generic ternary bit masks and at the same time being able to handle whatever parts of the rules that can be represented as ranges.

A classifier comprises an ordered set of cells, where a cell is represented by a ternary bit mask, or bit array, of size M.

By ternary, we mean that each bit can assume the value 0, 1 or "don't care". The "don't care" value is usually denoted by a * and is sometimes referred to as wildcard.

Sometimes we will also use key when referring to a cell not containing any wildcards, i.e. with all bits specified.

The bits of a key/cell are numbered from 0 to M−1, and bit i of key i and cell i are denoted by key[i] and cell[i], respectively.

A pair of keys, $key_1$ and $key_2$, are equal if $Vi=0; 1; 2; \ldots, M-1$ (referred to as Vi), $key_1[i]=key_2[i]$.

In the same way, $cell_1$ and $cell_2$ are equal if $cell_1[i]=cell_2[i]$ for all i.

A classifier, or classification engine, is a device providing: (i) a representation of N cells, and (ii) an operation for selecting cells matching a given query key.

In order for a query to match a cell, either cell[i]=*, query[i]=*, or query[i]=cell[i] for each i.

The operation is called classification. There are essentially two types of classification:
multi-match classification, which means to select all cells matching a given query key, and single-match classification, which means to select the cell with highest score among the cells that matches a given query key. The score of a cell can be a simple priority (e.g. $cell_1$ has highest score, $cell_2$ second highest, and so on), a function of the query key, or an arbitrary complex function that may or may not change over time.

For any pair of cells, $cell_1$ and $cell_2$, it can be said that that $cell_1$ dominates $cell_2$ if: any key that matches $cell_2$ also matches $cell_1$. If $cell_2$ is dominated by $cell_1$ and there exists a key that matches $cell_1$ but not $cell_2$, it can be said that $cell_1$ strictly dominates $cell_2$.

To further explain the concept of domination, consider a $cell_1$ and $cell_2$ and let $cell_1$ be a higher priority match (assuming single—as opposed to multi-match) than $cell_2$. Then, if $cell_1$ dominates $cell_2$ it may be considered that $cell_2$ is obsolete and thus remove it without changing the behaviour of the classifier.

According to an aspect of the present invention, an approach is to start with a Patricia tree which is enhanced to support storage of arbitrary cells as opposed to just keys. According to an aspect, the present invention provides multi-match, i. e. to identify all rules matching. It is also possible to use query keys comprising wildcards. According to another aspect, this is then followed by applying a number of techniques to increase search speed and reduce memory requirements.

Embodiments of the present invention according to these aspects will be described as follows, starting with some explanation of some concepts on which the invention is based on.

Patricia Trees

A Patricia Tree (PATRICIA—Practical Algorithm to Retrieve Information Coded in Alphanumeric, D. R. Morrison, 1968), is a binary tree that treats query keys as bit arrays, and uses a bit index in each internal node to direct the branching. Searching is accomplished by traversing the tree from the root to a leaf. When visiting an internal node with bit index i, bit i of the query key is inspected to determine whether to continue the search in the left (if the bit is 0) or right (if the bit is 1) sub-tree. The traversal stops when arriving at a leaf. To determine if the query key is present in the table or not, the query key is then compared to the key stored in that leaf. If the two keys are equal, the search is successful.

Insertion is accomplished by first performing an unsuccessful search, and recording the index i of the first mismatching bit in the comparison of the query- and leaf key. Two new nodes are then created, a new internal node with index i and a leaf node for the query key. Depending on whether bit i of the query key is 0 or 1, the leaf is stored as the left- or right sub-tree, respectively, of the internal node. By using the other sub-tree field as link field, the internal node is then inserted directly above the node with smallest bit index larger than i in the path traversed from the root to the leaf.

While the description above assumes that the bit indexes in the nodes, of the Patricia tree, are (heap) ordered such that the index of a node is larger than the index of its parent node (except for the root which has the smallest index), this is not necessary. It will work out equally well if the new node created during insertion is inserted directly above the mismatching leaf that will then become a sibling of the new leaf. However, the order in which keys are inserted will then result in different trees as opposed to heap ordered bit indexes which results in a canonical tree independent of the order of insertion. If an N-keys Patricia tree is to be built from scratch, another method can be used to select bit indexes and obtain a reasonably balanced tree.

This is achieved by analyzing the current set of keys, during construction of each node, and select the bit i which minimizes the maximum number of keys in the two sub-trees. Let $count_0[i]$ be the number of keys from the set of current keys were key[i]=0, and $count_1[i]$ be the number of keys from the current set of keys where key[i]=1. Then, the bit that should be selected to achieve a balanced partitioning is the i which maximizes $count_0[i] * count_1[i]$. The keys where key[i]=0 and key[i]=1 then becomes the current set of keys of the left and right sub-tree respectively.

Another option of selecting bits is to use brute force or a heuristic approach to achieve a tree with optimal, typically minimum, depth since this corresponds to minimum worst case search cost and faster search performance.

BRIEF DESCRIPTION OF DRAWING FIGURES

To further explain the present invention, embodiments thereof chosen as examples will now be described in greater details with reference to the drawings of which:

FIG. 1 shows a massively parallel CTF based classification engine according to an embodiment of the present invention.

DESCRIPTION OF EMBODIMENTS

Embodiments of the present invention will be described as follows, followed by a detailed description of some terms used and framework, in particular a Cell Tree Forest (CTF) framework and CTF based classification engine.

Now is referred to FIG. 1 showing a massively parallel CTF based classification engine 10, according to an embodiment of the present invention.

In FIG. 1, there is shown a static packet classification engine 10 configured to handle rules comprising wildcards and interval matching. The classification engine 10 is cell tree forest based and configured to search clusters to produce results 5. The classification engine 10 comprises an encoder, in particular a priority encoder 7 configured to process the results 5 in terms of union of matches, or in other words configured such that the results are aggregated.

In this way, a Patricia tree which is enhanced to support storage of arbitrary cells as opposed to just keys is provided.

The tree structures corresponding to each of the, at most M=304 (128+128+16+16+8+8=304) bits clusters are mapped on a corresponding pipelined tree search engine of depth T=~lg(N/M) such that cluster 1 is searched in steps 1,1 to 1,T, cluster 2 is searched in steps 2,1 to 2,T, cluster 3 in steps 3,1 to 3,T and so on. Search in all of the M×T steps are performed simultaneously such that every time when a new query key enters the search engine from the left, and is broadcasted to each of 1,1 to M,1, a new result is produced and output at the right part of the engine 10. After a query key has been searched in each of the last steps 1,T to M,T, the respective results are processed by a priority encoder which selects the "winning" result from each of the parallel searches if the application is single-match-search. In the more general case when multi-match search is performed, the priority encoder essentially computes the set union of all the results from the respective parallel searches. Herein, the term "search" includes "look-up".

While combining massive parallelization with pipelining to achieve the highest possible throughput it is also possible to serialize all these steps in a software embodiment.

In another embodiment of the present invention, the searches in each respective cluster are performed in parallel in a multi-threaded computer program product where yet another thread is dedicated for priority encoding and where the threads are running in parallel with or without dedicated hardware support in the form of one or many multi-core CPUs, multiple servers or similar.

In yet another embodiment of the present invention, the searches are serialized and run either in a single thread or multiple threads running on a single core CPU.

CTF Framework

From a mile high view, the CTF Framework is responsible for managing a search engine consisting of a forest of trees where each tree contains a number of cells. The CTF framework by itself does not constitute a search engine since the key features are that the CTF framework does not know what each cell represents, it does not know how to measure the distance between cells to determine which cells that should be in the same tree and which cells that should be in different trees, it does not know how to create pivots that discriminates between cell as is required to build nodes, and it does not know how to determine if two cells are matching each other. In a nutshell, the CTF framework is nothing without instantiation but when properly instantiated it can pretty much implement any search engine.

When creating an instance of the CTF Framework, a configuration is required. There are two parts of the configuration, the data part and the call-back part.

Before describing the configuration parts in detail we give a brief description of the principal operation.

Principal Operation

The main purpose of a CTF instance is to represent cells or lists of cells, where each cell represents an ACL rule when the CTF instance is used in the context of ACL classification, and to facilitate efficient search for all cells that matches a given query cell.

There are two modes of operation, static mode and dynamic mode. Whenever the CTF instance is empty, i.e. it contains no cells, it runs in static mode, which means that there is a build function available that accepts as argument not only a single cell but a list of cells. The build function partitions the list into the specified number of clusters and then builds one tree structure for each cluster.

In all other cases, the CTF instance is non-empty and thus runs in dynamic mode. During dynamic mode, the build function is not available. Instead, updates to the CTF instance are performed one cell at a time using an insert and a delete operation.

Configuration Data

The data configuration specifies number of trees to represent, which is the same as the number of clusters when partitioning the cell list in the build operation, and three parameters that determines the behaviour during partitioning, dirty, window, and heuristic, that will be explained further in the next chapter since they affect only the inner workings.

Call Back Functions

There are six call back functions that must be implemented and provided by the user and we will dedicate one section to each since it quite important to understand what they do at a high level.

Whenever a CTF instance is non-empty there will be at least one tree structure that contains a number of cells. These are stored in nodes and leaves where each node contains pivot information that the CTF Framework neither knows how to create nor how to interpret as this is done by user provided call back functions.

Optimize Call Back Function

The optimize call back function is used during construction and maintenance both during static and dynamic mode of operation. It is responsible for analyzing a list of cells and determine if it is possible to discriminate between the cells without using brute force, i.e. linear search. If the answer is no, the node builder function, which is part of the CTF Framework, will build a leaf instead of a node. If the answer is yes, the actual pivot information required to execute the discrimination must be built and made available to the node builder, and at the same time the list of cells analyzed is partially distributed in buckets, where each bucket corresponds to one outcome of the discrimination, such that each bucket contains exactly the cells that match that bucket with respect to the pivot information.

Index

The index call back function is the key operation executed during search when traversing the tree structure. It takes as argument a single cell, the query cell, and analyzes the cell, with respect to the pivot information stored in a node, to determine a set of outcomes where each outcome corresponds to a sub-tree where the search continues. If the query cell is fully specified, i.e does not contain any wildcards or similar, the outcome is normally a single sub-tree whereas a partially specified query typically result in searching multiple branches.

Match

The matching call back function is responsible for comparing two cells and determine if the first cell matches the second cell. Basically, this means that any fully specified query that matches the first cell, which for the ACL application in itself is a fully specified cell, also matches the second cell. This is used when searching through the list of cells stored in the leaves to retrieve all matching cells.

Distance

The distance call back function is used both during static and dynamic mode to compute a real number representing the distance between two cells. Exactly how this is done is determined by the user but there are three rules of thumb.
1. The distance between a cell and itself should be zero.
2. The function should be commutative.
3. The distance between cells should be low if they are easy do discriminate.
4. The distance between two cells should be high if they are hard to discriminate.

For example, the distance function used in for the ACL application, which is an example of application where cells actually represents ternary bit arrays (i.e. bit arrays where each bit is either 0, 1 or * (wildcard)), we use the following distance function:

Case 1. One divided by the number of discriminating bits.
Case 2. Number of bit positions where the bit in one of the cells is * and the bit in the other cell is not either 0 or 1.

Case 1 is used whenever there is at least one discriminating bit, i.e. a bit position where the bit in one cell is 0 and the bit in the other cell is 1, is present.

Comparison Call Back Function

The comparison call back function is used to compare cells in the same fashion as the comparison function passed to qsort and is the function used to determine in which order cells are stored in cell lists.

For the ACL application, the order between the cells is defined by the priority of the rules which means that cells that are stored in tree leaves are processed and matched in the correct order.

Cleaner Function

The cleaner function is used during reconstruction of the tree structures when nodes are destroyed. It is called with the pivot information stored in the node as parameter and is the place to implement user defined garbage collection of memory not directly allocated by the CTF instance.

A Working Example: Hash Table

Perhaps the best way to achieve a better understanding of the CTF Framework and in particular why it is not an ACL classifier in itself is to go through an example of how to use the CTF Framework to implement a data structure for a completely different application, namely exact matching of 64-bit non-negative integers.

We assume that we are running this on a 64-bit architecture so that the size of a pointer and a 64-bit non-negative integer is the same. This allows us to represent a cell directly as a 64-bit non-negative integer.

Let us assume that we want to represent a set as a hash table. The straight forward way to achieve this is to let each cluster correspond to a slot in the hash table. To achieve proper hashing, the distance function is implemented such that the distance between two cells that hashes to the same value is very small and such that two cells that hashes to different values is very big. This will take care of the hashing part.

The text step is to handle keys that hashes to the same slot. Now, we can just implement an optimize function that does nothing but returns false. This will force the CTF Framework to build leaves consisting of linear lists to represent each bucket. To search these leaves we implement a matching function which simply performs an exact comparison whereas the comparison function used to sort the lists could simply do a simple comparison and return −1 if the first key is smaller, +1 if it is larger and 0 if the keys are equal.

If we want to spend a little more effort, we could represent the keys that falls in the same bucket using a balanced binary tree instead. To achieve this, we implement an optimize function that sorts all the integers in the argument cell list and select the median as pivot point and then throw all smaller integers in the left sub-tree and all the larger than or equal integers in the right sub-tree.

The index function simply compares the query with the pivot in each node to determine whether to continue the search in the left or right sub-tree.

Sampler Algorithm

In this section, we describe the heuristic sampler algorithm implemented in ctf sampler.[ch]. Its main purpose is to provide a mechanism for partitioning a set of ternary cells (the sampler does not take into account that the rules also contains range components) into a specified number of clusters where the last cluster is potentially dedicated for cells that are estimated to be very badly behaving with respect to replication.

The first step in partitioning is to store the cells to be processed in an array to provide fast random access.

This is followed by scrambling the array.

Then the cost for each cell, defined as the average distance between the cell and the each cell in sliding window, of configurable size, consisting of the following WINDOW SIZE cells (modulo the array size) is computed.

The array is then sorted in increasing order with respect to increasing cost as computed in the previous step.

Partitioning is concluded by processing the cells in the same order as in the sorted array.

For Each Cell:

The distance to the sample representing each cluster is computed. We compute both the maximum and the average distance.

This is done for each cluster with the following two exceptions:

1.0

If we encounter a cluster where the maximum cost is less than or equal to 1.0, the cell is immediately added to that cluster without testing additional clusters.

0.6

In the same way, if we encounter a cluster where the average cost is less than or equal to 0.6, we add the cell to that cluster immediately without testing additional clusters.

Otherwise we record the smallest average distance and after trying all clusters we simply add the rule to the cluster where we get minimum average cost.

The numbers 1.0 and 0.6 have been determined by experimenting.

The first step in partitioning is to store the cells to be processed in an array to provide fast random access.

This is followed by scrambling the array.

Then the cost for each cell, defined as the average distance between the cell and the each cell in sliding window, of configurable size, consisting of the following WINDOW SIZE cells (modulo the array size) is computed. The array is then sorted in increasing order with respect to increasing cost as computed in the previous step.

Partitioning is concluded by processing the cells in the same order as in the sorted array.
For Each Cell:

The distance to the sample representing each cluster is computed. We compute both the maximum and the average distance.

This is done for each cluster with the following two exceptions:

If we encounter a cluster where the maximum cost is less than or equal to 1.0, the cell is immediately added to that cluster without testing additional clusters.

In the same way, if we encounter a cluster where the average cost is less than or equal to 0.6, we add the cell to that cluster immediately without testing additional clusters.

Otherwise we record the smallest average distance and after trying all clusters we simply add the rule to the cluster where we get minimum average cost.

The numbers 1.0 and 0.6 have been determined by experimenting.

Generalization to Achieve Classification in Set of Cells

Since all keys by definition also are cells, any Patricia tree storing a set of keys is a special case of classifier that supports exact single match search. An ideal Patricia tree, storing N cells, is a tree where the bit indexes in the nodes can be chosen such that a don't care bit never needs to be inspected when inserting a new cell. This corresponds to a Patricia tree with a bijective mapping from the set of leaves to the original set of cells from which the tree is constructed, hence resulting in a tree where the size is proportional to the number of cells (in fact, there will be exactly N external nodes and N−1 internal nodes). Analogously to the ideal Patricia tree, we refer to a set of cells, from which an ideal Patricia tree can be constructed, as an ideal set of cells.

It should be obvious that not all sets of cells are ideal (if it is not obvious, simply consider the set {*0, 0*}).

If the cell set is not ideal, some cells will be duplicated to two or more leaves. The primary impact from duplication is that memory requirements will increase and in the worst case explode. Furthermore, duplication typically has a negative impact on the problem instance reduction that implicitly takes place in each node. That is, the sum of the number of cells represented by the left and right sub-tree of a node may be larger than the total number of cells represented by the tree rooted at the node. Since the search speed is proportional to the inverse of the maximum depth of the tree, and the depth is related to the instance size reduction, duplication also has a negative impact on the search speed.

There are many possible heuristics for choosing which bit to inspect in a node during construction. According to an embodiment, a simple and straight forward method, which also seems to provide a reasonable trade-off between search speed and memory requirements, is the following:

Let $n_0[i]$, $n_1[i]$, and $n_*[i]$, be the number of cells from the current set of cells where bit i is 0, 1, and *, respectively, and then choose i such that $$\text{cost}(i)=\max(n_0[i]+n_*[i], n_1[i]+n_*[i])$$

is minimized.

Some alternative methods that also take into account skewness, different fan-out and weighted buckets are now described. All these are in the form of cost functions where the (some) cost is computed based on how the node construction turns out for different strategies and the general rule is to select the outcome that yields the smallest cost for each node constructed. Thus, this is a local optimization and does not guarantee a fully optimal overall k tree structure. The different cost functions developed are the following:

function 0: (sum−n)+max*max+min*min
function 1: (sum−n)*max*k
function 2: (sum−n)*(sum−n)+max*max+min*min
function 3: (sum−n)/k+min*min+max*max/k
function 4: (sum−n)+min*min+max*max/k
function 5: (sum−n)+min*min/k+max*max
function 6: (sum−n)*(sum−n)+min*min/k+max*max
function 7: swo+rep*rep/k The respective variables used are defined as follows:
n is the original number of cells before optimization/construction of the node.
m is an array of integers where each element represent one bucket and the integer how many cells that ended up in that bucket. NOTE: Ideally, the sum of m[i]' equals n as this would mean zero replication.
sum is the sum of all m[i]'s.
min is the smallest m[i].
max is the largest m[i].
rep equals sum−n.
w is an array of weights where the sum of weights equals 1, where each weights corresponds to a bucket and represent the ideal number of cells in that bucket with respect to the other buckets. Typically, all weights are equal, but there are situations when it is ideal that ⅔ of the cells falls in bucket 0 and the rest falls in bucket 1 and then w[0]=⅔ and w[1]=⅓ is used.
swo is the squared weighted
offset of the m[i]'s, i.e. the sum of (m[i]—n*w[i])^2 from 0 to k−1.
n Number of cells before partitioning.
m Array of cell counts each corresponding to one of the buckets.
w Array of weights corresponding to target weights of the buckets.
k Number of buckets.

The sum w[0]+w[1]+ . . . +w[k−1] must be equal to 1.0.

When dealing with non-ideal sets of cells, there are subsets that are hard, if not impossible, to partition (herein meaning discriminate between) without inspecting many bits. This is expected and something that occur near or within the leaves of the tree. To avoid having the builder build multiple levels, for example when there are only two cells, a maximum number of cells, or size, per leaf is specified and when the size of the current set of cells is smaller than or equal to the size limit, the construction stops and a multi-cell leaf is obtained. In the same fashion, we specify a depth limit (the depth of the root is zero), which causes the builder to halt when reaching the depth limit, also resulting in a multi-cell leaf. Since multi-cell leaves typically are quite small, finishing up the lookup can easily be achieved using linear search.

It is also possible to use other hardware assisted techniques such as TCAM memories or similar.

In the following, embodiments improving classifier performance will be described.

Improving Search Speed

Level Compression Using Direct Indexing

According to an embodiment search speed is improved by using level compression and replace the root node with a $2^k$ elements array (sort of an M-trie node) where k carefully selected bits from the query key are used as index. There are many possible methods of selecting these k bits and we will here outline two of those.

Method 1. Start by building the tree without level compression and then add the bit index from the root, and let the set of candidates include the left and right sub-tree of the root respectively. There are now k−1 bits indexes left to select. Repeat the following until no additional bit indexes to select remains:

find the node C in the set of candidates which is the root of the deepest sub-tree (i.e. the sub-tree likely to yield the worst case lookup cost), remove C and add the root of C's left and right sub-tree to the set of candidates followed by selecting the bit index of C.

Method 2. Start by building the tree without level compression. For each leaf and each bit i inspected while traversing the path from the root to the leaf increment $hist_0[i]$ if the leaf is in the left sub-tree of the node containing bit index i and similarly increment $hist_0[i]$ of the leaf is in the right sub-tree.

Then sort the bit indexes 0, 1, 2, . . . , M−1 using the following ordering criteria:

$hist_0[i]+hist_1[i]>hist_0[j]+hist_1[j]=>i$ precedes j
$hist_0[i]+hist_1[i]<hist_0[j]+hist_1[j]=>j$ precedes i
$|hist_0[i]-hist_1[i]|<|hist_0[j]-hist_1[j]|=>i$ precedes j
$hist_0[i]-hist_1[i]|>|hist_0[j]+hist_1[j]|=>i$ precedes j Finally, select the first k bit indexes in the sorted array.

Level Compression Using Sub-tree Compression

An internal node in a Patricia tree consists of a bit index and a pointer to each of the left and right sub-tree respectively. If the tree is small, the number of bits used to represent pointers can be reduced substantially. The technique is best explained by an Example. Lets say that we can access 64 bytes in a single memory access, and assume that the processing cost of these 64 is negligible compared to the cost for the memory access (in most cases a fair assumption). Furthermore, assume that M<256 such that 8 bits is sufficient to represent the bit index and that N is small enough such that 16 bits pointers are sufficient to address any node in the Patricia tree. We can then store 16 pointers, typically leaves, and 16 nodes in 64 bytes if we use two bytes for each leaf and each node. A Patricia tree, herein a miniature, with 16 leaves requires 15 internal nodes. Each node consists of an 8-bit index and two 4-bit pointers. Four bits is sufficient to encode a pointer to any node or any leaf within the miniature tree stored in the 64 byte block, but we do not know whether the pointer refers to a to a leaf or a node. Now, we know that we have 16 nodes. For each node, either: both pointers refer t nodes, the left to a node and the right to a leaf, the left to a leaf and the right to a node, or both pointers refer to leaves. Nodes can therefore be organized in four groups according to what their respective pointers refers to, and stored such that nodes from the same group are stored adjacent to each other. It then remains to record how many nodes there are in each group for, which requires the 4×4 additional spare bits available since we have one unused node.

Clearly, the effect achieved in the example is that a 16-ary super node that only requires a single memory access to process. Hence, we get at least 5 memory accesses for the prize of 1 memory access (more if the tree is skew). The technique can easily be generalized to larger memory accesses (e.g. disc blocks), as well as larger keys and data structures.

Embodiments improving memory requirements will now be described.

Base Line Linear Search

We have defined the concept of ideal set of cells above. Intuitively, the further away from ideal a set of cells is, the harder it is in some sense to represent as a Patricia tree.

Clearly, any set of cells of size 1 is ideal. Therefore, we can always create N clusters with one single cell in each cluster, for each cluster perform lookup in an ideal Patricia tree (of size 1) and then select the highest priority match using linear search.

Now, while this observation is rudimentary obvious, it serves as the base line for the following discussion about how to combine clusters into larger clusters.

Defining a Proper Distance Function

It is assumed that cells are distinct. Otherwise, the highest priority cell of two identical cells can be kept and the other cell discarded without changing the behaviour of the classifier. This can be repeated until all cells are distinct.

Our goal is build clusters of cells that are in some sense close to each other such that the maximum distance between two cells in each cluster, called the diameter of the cluster, is smaller. The following distance function will be used:

$$distance(cell_1;cell_2)=1/k$$

If we can choose any of k single bits of the key to inspect and each such inspection is sufficient to determine whether to continue with a full comparison of the key to $cell_1$ or $cell_2$.

$$distance(cell_1;cell_2)=k$$

If inspection of at least k (carefully selected) bits of the key to $cell_1$ is necessary to determine whether to continue with a full comparison of the key to $cell_1$ or $cell_2$.

If the cells have priorities, such as in most of the applications currently considered, it makes sense to assume that $cell_1$ has higher priority than $cell_2$, and never really use $distance(cell_2; cell_1)$.

Examples $$distance(011*10;00*1*1)=\frac{1}{2}$$

$$distance(10**0*;*001**)=2$$

The distance between two clusters $C_1$ and $C_2$ is defined as the largest distance between a cell in $C_1$ and a cell in $C_2$. Furthermore, we define the center of a cluster as the cell with smallest maximum distance to another cell in the same cluster and the representative of a cluster as the cell with smallest average distance to another cells in the same cluster. Finally, it is referred to the process of repeatedly clusters together as aggregation.

We have identified two key properties of clusters and aggregation:

Property 1. Any cluster with diameter less than or equal to 1 is ideal.

Property 2. Any set of N cells of size M, can be aggregated into M clusters of diameters less than or equal to 1.

We have also implemented a highly efficient symmetric distance computation algorithm, i.e. a function where distance(a,b)=distance(b,a) for all a,b, that exploit hardware supported bit count operations and heavily exploit bit parallelism.

```
float
cell_dist(cell_t *cell1, cell_t *cell2)
{
    uint64_t diff, *bits1, *bits2, *mask1, *mask2;
    int i, n, k = 0;
    assert(cell1->size == cell2->size);
    bits1 = cell1->bits;
    bits2 = cell2->bits;
    mask1 = cell1->mask;
```

-continued

```
        mask2 = cell2->mask;
        n = cell_chunks(cell1->size);
        for (i = 0; i < n; i++) {
            diff = (bits1[i] ^ bits2[i]) & mask1[i] & mask2[i];
            if (diff == 0x0000000000000000) continue;
            k += _builtin_popcountl(diff);
        }
        if (k > 0) return 1.0 / (float)k;
        for (i = 0; i < n; i++) {
            diff = mask1[i] ^ mask2[i];
            if (diff == 0x0000000000000000) continue;
            k += _builtin_popcountl(diff);
        }
        return (float)k;
    }
```

The Cluster Aggregation Algorithm

In this section we define the Cluster Aggregation Algorithm used to process cell sets into clusters such that each cluster can be represented as a Patricia tree and searched individually to produce one (or a few) results for each cluster. To resolve the final result some arbitration algorithm (compare priority encoder as used in Ternary Content Addressable Memory chips) is used to select the highest priority matching cell from the set of individual results, or conclude that no matching cell exists.

The input to the clustering algorithm are as follows:

| | |
|---|---|
| C | The current set of clusters $\{C_1, C_2, \ldots, C_L\}$, where each $C_i$ is a set of cells. |
| d | The maximum diameter accepted. |

In the description of the aggregation algorithm we will use standard binary operators such as <, assignment=and set operators + and −, which will represent union and relative complement. Also, we will use |S| to denote the cardinality of a set S.

The algorithm is as follows:

Algorithm 1 aggregate(C, d)

```
loop
    if |C| < 2 then
        return C
    end if
    Choose C_a, C_b ∈ C which minimizes distance(C_a, C_b)
    if d < distance(C_a, C_b) then
        return C
    end if
    C = C + {C_a + C_b} − {C_a, C_b}
end loop
```

Redundant Tree Elimination

Independently of whether level compression is used or not or whether cells are aggregated into optimal clusters or not, a large number of sub-trees are created when the Patricia tree is constructed, and, in many cases, there are duplicates among these sub-trees. In particular if some cell replication occurs, it is very common to find identical leaves at many different places in the Patricia tree. This will cause a memory blow-up if it is not addressed. To deal with this problem, it is necessary to keep track of, and find out, whether there are duplicates among the sub-trees. However, this is not merely a problem local to a given node. In the process of eliminating redundant sub-trees, we may as well perform the optimization of the tree globally. This is achieved by maintaining a database of problem instances where each problem represents the set of cells that are applicable (i.e. possible to match). Hence, when about to build the root of a sub-tree during construction, we first lookup the current set of cells in a Cell Set Database (CSDB) and if it is present, this means that there already is a sub-tree built that represent the exact same problem instance as the one currently about to be constructed. Hence, we may (or may not) decide to skip construction of the new sub-tree and link to the present one instead.

Now, what would be the reason to build a new sub-tree representing an identical problem instance instead of using the one already available? Well, the reason could be that we arrived at the current problem instance by inspecting an entirely different set of bits compared to the bits inspected prior to ending up in the root of the already built sub-tree. In combination with this, the depth could also be different such that linking to the existing sub-tree would cause the lookup to back up to a higher tree level thus increasing the effective depth of the existing sub-tree if liked to.

Linking to existing sub-trees effectively create short-cuts in the tree structure (which then becomes a directed acyclic graph). This means that there may be several paths that lead down to the same node. Each such path represents a number of bits that are inspected and certain values of these bits. To provide sufficient information to determine whether to link or not, we must keep track of these paths. Therefore, for each node, we record what we call a scope. The scope in its most general sense is a collection of all paths leading to the node including the values of all bits inspected. However, in many cases it is sufficient to represent the path as a cell, just as the cells that are stored in the tree, where bits that have been inspected in one or more of the paths with identical outcome, i.e. the bit was either 0 or 1 in all paths, have the same value as the outcome, and bits that have not been inspected or where both outcomes have occurred are represented by don't care.

Note: To achieve the best maintenance of and fully exploit scopes and obtain an optimal tree structure it is best to build the tree breadth first from scratch and delay construction of each node to the point where all possible paths that may lead to that node have been fully constructed.

Redundant Root Elimination

All level compression techniques discussed above are radix based, which means that a number of bits, say k bits, are inspected and the result is a k-bit non-negative integer which is used as index into an array that potentially contains $2^k$ children. Depending on the implementation, each child is either represented by a reference to the root node of the sub-tree representing the child or by the root node itself.

If there are many redundant sub-trees (see previous section), there will be several copies of identical references, or root nodes, that can waste a considerable amount of memory. Typically, k is smaller than the size of a reference and considerably smaller than the size of a node. We can therefore represent each reference or root node by a k-bit non-negative integer instead of the reference or root node itself. For k=6, this would save roughly 26 bits and 15 bytes for each redundant tree for 32 bit references and 16 byte nodes, respectively.

Maximum impact from this technique, with minimum penalty on the search speed, is achieved by storing the index array as part of the node where the level compression takes place so that comparison, search and locating the reference to or root node of the sub-tree where to continue the search can be done in a single memory access.

Construction and Maintenance of the Classifier
Building a Classifier from Scratch
Configuring the Builder Before constructing a classifier it is necessary to determine which building blocks to use (not all improvements described above are necessary to use at all times) and, to determine roughly how much memory to use per cell stored in the classifier, and possibly also determine an upper limit on the maximum search cost.

It is hard to predict in advance exactly how a classifier will behave when subject to a certain input and therefore it is a good idea to first perform a clustering, using 2-5 as maximum diameter limit, using a cell set that in some sense is typical, and then build a straight forward Patricia tree from scratch for each cluster. This will provide a basis for analyzing the cell set, understand whether the cluster diameter limit can be decreased further (without blowing up memory), and understand how aggressive level compression that is required to meet the search cost budget.

Batch Construction Pseudo-Code

Let $C=\{c_1, c_2, \ldots, c_N\}$, be the initial cell set and d the maximum diameter. To build a classifier from scratch we run the following:

Before describing the generic tree-build function, we will introduce the concepts: Pivot and Index.

Pivot

Is information stored in the node and used to map a cell to a set of

---
Algorithm 2 buildforest(C, d)
---
```
C = aggregate(C, d)
for all C_i ∈ C do
    P_i = buildtree(C_i)
end for
```
--- outcomes, i.e. which sub-trees where the lookup should continue (if the cell contains wildcards), e.g. which bit to inspect.

Index

Is a mapping from a (cell, pivot) pair to a set of outcomes, where each outcome represents a sub-tree of the node. We will represent outcomes by indexes $0, 1, \ldots, n-1$, where n is the number of outcomes.

---
Algorithm 3 buildtree(C)
---
```
C_0, C_1,..., C_{n-1} = { }
Compute the best (index, pivot) pair based on C
for all c_i ∈ C do
    O = index(pivot, C)
    for all o ∈ O do
        C_o = C_o + {c_i}
    end for
end for
for all i = 0,1,...,n − 1 do
    buildtree(C_i)
end for
```
---

Exactly how the best (index; pivot) pair is computed depends on the optimization criteria (speed, space, some trade off etc.) and what kind of constructs for discrimination are available. In general, any kind of information that can be used to determine if some cell may or may not be used. For example, information based on geometrical information (i.e. point location style interval matching) or complex checksums that actually causes the tree structure to deviate from being a simple Patricia tree.

In the simplest possible scheme, however, the tree is still a Patricia tree, the pivot constitutes the position of the bit to inspect, and the index function constitutes a simple bit inspection. In this case, there are only two outcomes, the left (0) and right (1) sub-tree.

Note that the (index, pivot) pair is stored in the node as part of the construction and are used later on when the node is processed during search. For each node constructed, we record the depth of the node, the maximum height of the sub-tree rooted at the node (as the recursion rolls up), the scope, and also insert the node in a data structure to keep track of known problem instances.

If the resulting trees are too deep they are traversed and level compression (using Method 1) is applied afterwards (Note that Path Ripping is a special case of Method 1 level compression applied to deep and skinny tree structures).

Aspects of Incremental Updates—Maintaining a Dynamic Classifier
Selecting the Best Cluster When a classifier is up an running and a new cell is to be inserted, the first step is to decide in which cluster it belongs. If we assume that computational resources are unlimited, the best result will be achieved if we would compute the distance between the new cell and all existing cells to and add it to the cluster where its addition will have minimum impact on the diameter. However, the simplest and least computational intensive approach to achieve this is by computing the distance between the new cell and the representative or center of each cluster and simply choose the cluster where we find the smallest distance.

Detecting Deteriorating Clusters

Insertion of the new cell may or may not increase the diameter of the cluster and successive insertions may cause the cluster properties to deviate quite heavily from the initial requirements. There are a number of possible ways to detect that there is something wrong with the cluster depending on how computationally intensive insertion operation we can afford. The archetype symptoms are the following:

Replication: Considerable replication during insertion in the Patricia Tree either indicates that the wrong cluster has been chosen or that there is something wrong with the cluster.

Towering: Successive insertions of new cells causes successive creation of new nodes (i.e. the bits currently used to discriminate will not do for the new cells), either indicates that the wrong cluster has been chosen or that there is something wrong with the cluster.

The remedy when a cluster has deteriorated too much is to re-cluster it into two or more clusters and reconstruct the corresponding classifiers in a process (compare with de-fragmentation).

Straight Forward Insertion

Insertion of a new cell is achieved by first choosing the best cluster and then traverse the tree until reaching a leaf. For each bit inspected where the value of the bit in the cell is don't care, insertion is performed recursively in all sub-trees where the wild card matches (replication). To simplify the description, we provide pseudo-code for a Patricia tree without level compression.

---
Algorithm 4 insert(T,c)
---
```
if T = NULL then
    return LEAF(c)
end if
If T = LEAF(c') then
    return NODE(INDEX(c,c'),T,LEAF(c))
end if
```

Algorithm 4 insert(T,c)

```
if c[T.index] ≠ 1 then
    T.left ← insert(T.left, c)
end if
if c[T.index] ≠ 0 then
    T.right ← insert(T.right, c)
end if
return T
```

In the insert procedure above, we assume that LEAF is a constructor for creating a leaf from a cell, NODE is a constructor for creating a node from a bit index and a pair of sub-trees, and INDEX is a function that locates the index of a discriminating bit from a pair of cells. Note: For the insertion to work in as simple way as described above, the distance between c and c0 must be less than or equal to 1.

Partial Level Compression

When no level compression is used and/or the tree structure used for search is stored in the same memory and operated on by the same standard CPU running the maintenance algorithm, it makes sense to use a single Patricia tree for each cluster and perform both updates and search in a single tree structure (using some locking mechanisms to prevent synchronization issues).

However, in other cases, it is better to use one vanilla Patricia tree (augmented with adequate book keeping information) for maintenance and another heavily optimized tree for search, for each cluster. This is similar to using a combination of RIB and a FIB for routing/forwarding lookups. We will refer to dynamic vanilla Patricia trees used for updates as master trees and the collection of those for all clusters as master forest respectively while the heavily optimized trees and corresponding forest are referred to as slave trees and slave forest respectively. Note: For some applications that requires multiple search engines running in parallel more than one slave forest can be used.

If level compression is not used, a single node in the slave tree corresponds to exactly one node in the corresponding master tree. This is typically not the case when level compression and other optimizations are used. In what follows, we briefly outline the procedure for incremental updates (insertion or deletion) of slave trees where level compression is used:

Algorithm 5 Incremental update of tree using level compression
1. Update the master tree and keep track of all paths affected by the update
2. Identify all nodes in the master tree affected by the update
3. Map the affected node in the master tree to affected nodes in the slave tree {paths in the master tree typically correspond to compressed paths in the slave tree containing fewer nodes.}
4. Perform partial reconstruction in the slave tree of all affected nodes on the compressed paths If insertions and deletions (basically the inverse of insertion) are done in a straight forward fashion and many updates have occurred after the batch construction, or the tree is constructed exclusively by repeated straight forward insertions, the tree structure may be much less efficient compared to how it would be if it were re-constructed from scratch after each update.

When a sub-tree is badly balanced there may either be a big difference between the number of cells in its sub-trees or big differences between the depths of sub-trees. To facilitate efficient on-the-fly re-balancing, each node in the master tree maintains a histogram that shows the number of occurrences of 0, 1, and don't care for each bit across the cells stored in the sub-tree rooted at the node. This is called cell histogram of the node. Furthermore, each node can also contain a scope histogram in which for each bit position the number of nodes in the sub-tree where that bit is inspected is recorded The static classification engine according to the present disclosure provides multi-matching, i. e. identifies all rules matching. The static classification engine according to the present disclosure present is also applicable to search keys containing wildcards and for a very powerful NoSQL database.

The invention claimed is:

1. A static packet classification engine, comprising:
    a cell tree forest framework including at least one tree, wherein the at least one tree includes a plurality of cells;
    logic configured to handle rules that comprise wildcards and interval matching;
    logic configured to search clusters of cells to produce results, wherein the clusters are formed by partitioning cells containing rules such that cells within a prescribed distance from each other, as determined by a distance function, belong to the same cluster;
    a priority encoder configured to process the results in terms of union of matches; and
    logic configured to search a first cluster in steps 1,1 to 1,T, a second cluster in steps 2,1 to 2,T, a third cluster in steps 3,1 to 3,T up to an M:th cluster in steps M, T, wherein the engine is configured to perform search in all of the M×T steps in parallel such that every time when a new query key enters the search engine, and is broadcasted to each of 1,1 to M,1, a new result is produced and output from the engine, wherein after a query key has been searched in each of the last steps 1,T to M,T, the respective results are processed by the priority encoder.

2. The classification engine according to claim 1, wherein the priority encoder is configured to select a winning result from each of the parallel searches.

3. The classification engine according to claim 1, wherein the priority encoder is configured to compute the set union of all the results from the respective parallel searches.

4. The classification engine according to claim 1, further comprising logic configured to perform level compression.

5. The classification engine according to claim 4, further comprising logic configured to use direct indexing for level compression.

6. The classification engine according to claim 5, further comprising logic configured to perform level compression and replace a root node with a $2^k$ elements array, where k selected bits from the query key are used as index.

7. The classification engine according to claim 4, further comprising logic configured to use sub-tree compression for level compression.

8. The classification engine according to claim 1, further comprising logic configured to use base line linear search.

9. The classification engine according to claim 1, further comprising logic configured to define a proper distance function.

10. The classification engine according to claim 1, further comprising logic configured to use a cluster aggregation algorithm.

11. The classification engine according to claim 1, further comprising logic configured to use redundant tree elimination.

12. The classification engine according to claim 1, further comprising logic configured to use redundant root elimination.

\* \* \* \* \*